US 6,989,799 B1

(12) United States Patent
Pittman, II

(10) Patent No.: US 6,989,799 B1
(45) Date of Patent: Jan. 24, 2006

(54) ANTENNA ASSEMBLY INCLUDING A DUAL FLOW ROTATING UNION

(75) Inventor: John Edward Pittman, II, Ashland, MA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 10/949,173

(22) Filed: Sep. 24, 2004

Related U.S. Application Data

(62) Division of application No. 10/175,761, filed on Jun. 20, 2002, now Pat. No. 6,851,724.

(51) Int. Cl.
*H01Q 3/02* (2006.01)

(52) U.S. Cl. .................. 343/882; 343/757; 285/275

(58) Field of Classification Search ............... 343/709, 343/757, 878, 882; 285/275

See application file for complete search history.

(56) References Cited

U.S. PATENT DOCUMENTS

| 3,586,352 A | * | 6/1971 | Smulders ............... 285/121.5 |
| 4,142,742 A | * | 3/1979 | Cornett et al. ........ 285/121.3 |
| 6,851,724 B2 | * | 2/2005 | Pittman, II .............. 285/275 |

* cited by examiner

*Primary Examiner*—Shih-Chao Chen
(74) *Attorney, Agent, or Firm*—Iandiorio & Teska

(57) ABSTRACT

An antenna assembly including a first rotating pedestal including an antenna thereon, a second pedestal supporting the first pedestal, and a dual flow rotating union having a longitudinal axis. The dual flow rotating union includes a rotating housing portion coupled to the first rotating pedestal, a stationary housing portion coupled to the second stationary pedestal, and a conduit located in the housing portion. The conduit has opposing ports oriented parallel to the longitudinal axis, a rotating section and a stationary section. One said conduit port is located on the rotating section, and the other conduit port is located on the stationary section. The housing also has opposing ports oriented parallel to the longitudinal axis. One housing port is located on the stationary portion, and the other said housing port is located on the rotating portion.

20 Claims, 8 Drawing Sheets

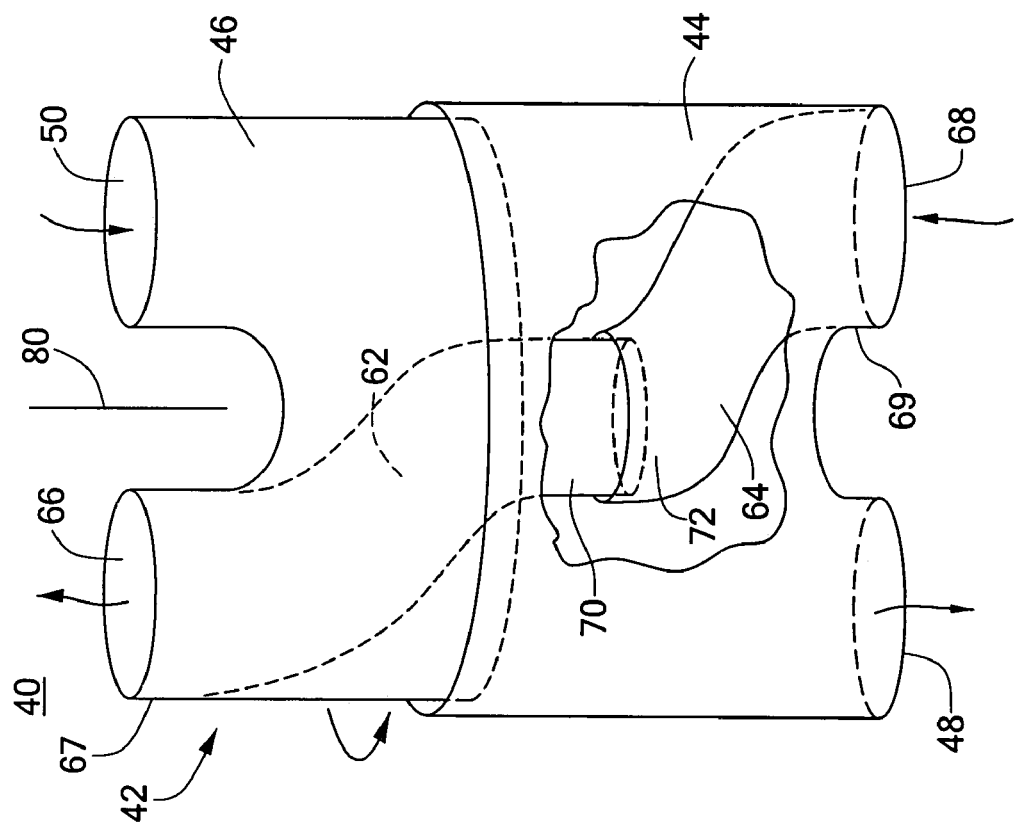
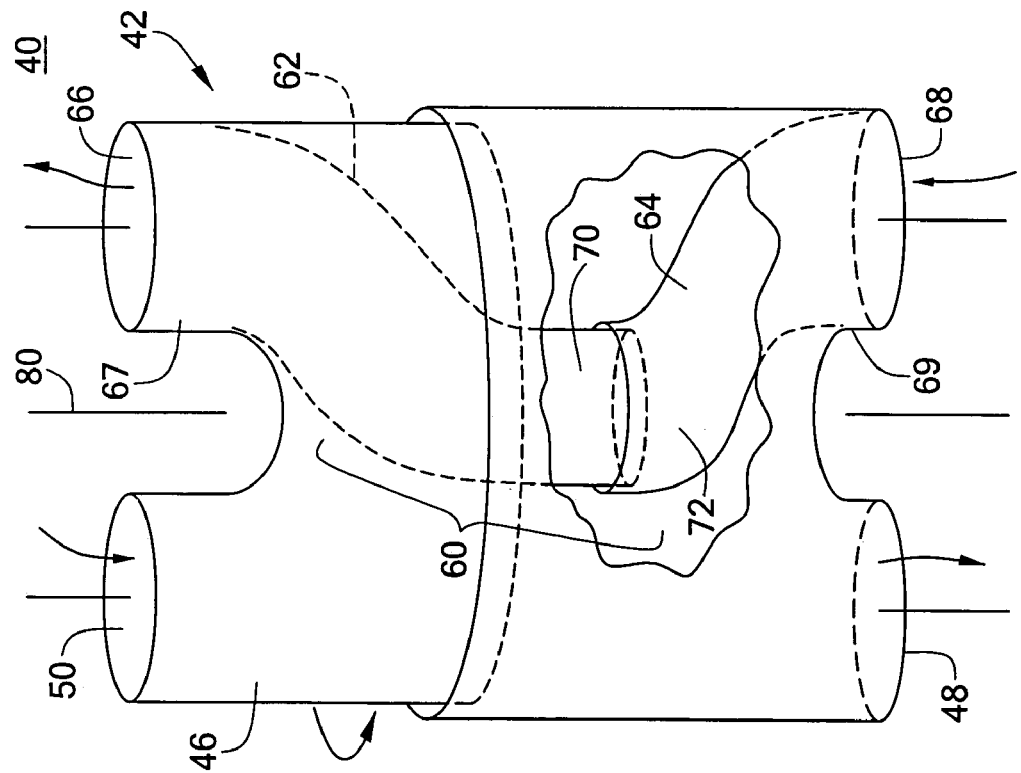

ANTENNA ASSEMBLY INCLUDING A DUAL FLOW ROTATING UNION

RELATED APPLICATIONS AND PRIORITY CLAIM

This application is a divisional application of prior U.S. patent application Ser. No. 10/175,761 filed on Jun. 20, 2002, now U.S. Pat. No. 6,851,724, which is hereby incorporated herein by reference, and to which this application claims priority.

GOVERNMENT RIGHTS

The U.S. Government has a paid-up license in this invention and the right in limited circumstances to require the patent owner to license others on reasonable terms as provided by the terms of Contract No. N00024-99-C-5380 awarded by the U.S. Navy.

FIELD OF THE INVENTION

This invention relates to an improved rotating union and, in one example, a dual flow rotating union for delivering and returning a large volume of fluid through ports preferably aligned parallel to the longitudinal axis of the union.

BACKGROUND OF THE INVENTION

Many rotating systems such as phased array antennas aboard ships require liquid cooling for reliable operation. Phased array antennas are large structures and can be attached to an oscillating pedestal normally located on a ship's deck.

Because of their large size, the liquid cooling system for such antennas are located off the rotating pedestal. Typically, fluid coolant passes to and from the rotating antenna at high flow rates and pressures through a relatively narrow space. In military applications, the liquid cooling delivery system must be able to survive high shock loads. Therefore, complex delivery systems consisting of numerous parts are bound to experience more failures than delivery systems with less components. Lighter weight systems with a minimum of performance problems are desired. Additionally, leakage of liquid coolant onto the deck of a ship must be avoided.

Accordingly, because of the lack of space and the various loads involved, pedestal mounted phased array antennas offer unique challenges for the design of the coolant delivery system, especially the dual flow rotating union, also referred to as a liquid rotary joint.

Currently known dual flow rotating unions have a rotating portion, a stationary portion, and at least one port running perpendicular to the rotation axis making packaging of such assemblies difficult. The use of a perpendicular ports also requires larger bearings to withstand the moment loads due to the cantilevered connection to the perpendicular port. Thus, the overall system size and complexity is increased.

Also, currently known dual flow rotating unions that deliver fluid through a rotating axis are large, complex, and heavy units. Moreover, known rotating unions typically utilize a face seal between the fixed and rotating conduits. Face seals, unfortunately, require a large envelope size and thus increase the size of the system. Face seals also require strict tolerances, thus increasing the complexity and cost of the system as well as increasing the potential for system malfunctions or failures. Moreover, face seals do not work well in oscillating applications, such as the phased array antenna system described above.

Furthermore, currently known rotating unions normally require fluid flow through each conduit to be in the same direction for eventual mixing of the fluids, without the capability for delivery and return of the fluids while keeping the fluids in each conduit separate throughout the delivery and return process. In addition, currently known dual flow rotating unions have no provision for leak containment or leak detection at the onset of seal wear or failure.

In summary, no currently available rotating union meets the unique requirements of a phased array antenna system or similar systems.

SUMMARY OF THE INVENTION

It is therefore an object of this invention to provide a more streamlined, lighter weight, less complex, more robust, and improved dual flow rotating union.

It is a further object of this invention to provide such a dual flow rotating union with all of the ports thereof aligned parallel to the longitudinal axis of the union and parallel to the axis of rotation of the rotating portion of the union.

It is a further object of this invention to provide such a dual flow rotating union which delivers and returns fluid in the direction of the same axis.

It is a further object of this invention to provide such a dual flow rotating union which eliminates the need for face seals.

It is a further object of this invention to provide such a dual flow rotating union which provides a contained pathway for small leaks and which allows for leak detection at onset of seal wear-out or failure.

It is a further object of this invention to provide such a dual flow rotating union which can be used in oscillating systems.

It is a further object of this invention to provide such a dual flow rotating union which can accommodate high volume fluid flows and pressures and which is able to survive large shock loads.

It is a further object of this invention to provide such a dual flow rotating union which can provide for both the delivery return of fluids along separate paths and in different directions.

The invention results from the realization that a more streamlined and less complex dual flow rotating union is effected by an inner conduit which curves in a serpentine fashion from a stationary inlet port to a rotating outlet port both located at the outer extent of the union and wherein the conduit curves such that the junction between the rotating portion of the conduit and the stationary portion of the conduit is located on the longitudinal axis of the union. The union housing, which surrounds the serpentine conduit, has a rotating inlet port and a stationary outlet port both also located at the outer extent of the union. In this way, all the ports of the union can be oriented parallel to the longitudinal axis of the union providing a more streamlined union with fairly large diameter flow ports capable of accommodating large volumes of cooling liquid and eliminating the need for the right angle ports of the prior art. Moreover, in such a design, the face seals used in prior art unions—seals which are large and complex and which cannot, in any event, be used in oscillating implementations such as antenna arrays—can be avoided and replaced with more simple soft radial seals.

This invention features a dual flow rotating union having a longitudinal axis, the union including a conduit having opposing ports preferably oriented parallel to the longitudinal axis. The conduit has a rotating section and a stationary section, one conduit port is located on the rotating section, the other conduit port is located on the stationary section. A housing is disposed about the conduit and has opposing ports preferably oriented parallel to the longitudinal axis. The housing also includes a stator portion and a rotor portion rotatably disposed with respect to the stator portion. One housing port is located on the stator portion, the other housing port is located on the rotor portion. Preferably, the conduit curves such that a distal end of the rotating section of the conduit rotatably mates with a proximal end of the stationary section of the conduit at a location on the longitudinal axis of the union. The distal end of the rotating section of the conduit is typically received in the proximal end of the stationary section of the conduit.

The dual flow rotating union of the present invention may further include a combined bearing and seal made of carbon and teflon located between the proximal end of the stationary section of the conduit and the distal end of the rotating section of the conduit.

The dual flow rotating union of the present invention may further include a bearing assembly disposed between the distal outer wall of the rotor portion of the housing and the proximal inner wall of the stator portion of the housing. Also, a radial seal is disposed between the distal outer wall of the rotor portion of the housing and the proximal inner wall of the stator portion of the housing. A seepage port may also be included disposed between the proximate inner wall of the stator portion of the housing and a proximate outer wall of the stator portion of the housing.

The rotor portion of the housing typically has a distal outer wall rotatably received within the proximal inner wall of the stator portion of the housing. The rotating section port of the conduit may be disposed adjacent the rotor port of the housing and the stationary section port of the conduit may be disposed adjacent the stator port of the housing. In a preferred embodiment, the rotor portion of the housing and the rotating section of the conduit have an axis of rotation the same as the longitudinal axis.

In one example, the housing forms another conduit between the housing port located on the stator portion and the housing port located on the rotor portion. The rotor portion of the housing may oscillate along with the rotating portion of the conduit, and flow through the conduit may be, in one example, in a direction opposite flow through the housing, or may be in the same direction.

This invention further features a dual flow rotating union having a longitudinal axis, the union preferably including a conduit having opposing output ends oriented parallel to the longitudinal axis. The conduit may include a rotating section and a stationary section with one conduit output end located on the rotating section and the other conduit output end located on the stationary section. A housing may be disposed about the conduit, and the housing may have opposing output ends oriented parallel to the longitudinal axis. The housing may further include a stator portion and a rotor portion rotatably disposed with respect to the stator portion with one housing output located on the stator portion and the other housing output located on the rotor portion. In one example, the conduit curves such that the distal end of the rotating section of the conduit rotatably mates with the proximal end of the stationary section of the conduit at a location on the longitudinal axis of the union.

This invention also features a rotating union with a serpentine conduit having first and second sections one of which rotates with respect to the other. The distal end of the first conduit section is rotatably coupled to the proximal end of the second conduit section at a location on the longitudinal axis of the union. The rotating union may further include a housing disposed about the serpentine conduit. The housing has a first portion which rotates with respect to a second portion. The distal end of the first housing portion is typically rotatably coupled to the proximal end of the second housing portion.

Additionally, this invention features a dual flow union including a rotor housing with two parallel ports, a stator housing with two parallel ports, a conduit disposed in the rotor housing and the stator housing interconnecting one rotor port with one stator port. Preferably, the sum of the perimeter of the rotor ports is a dimension the same order of magnitude as the perimeter of the rotor housing and the sum of the perimeter of the stator ports is a dimension the same order of magnitude as the perimeter of the stator housing.

This invention also features a dual flow union having a rotor housing which includes two spaced parallel ports, a stator housing including two spaced parallel ports, and a conduit interconnecting one rotor port with one stator port. Typically, both of the rotor ports are located proximate the periphery of the rotor and both of the stator ports are located proximate the periphery of the stator.

This invention further features a rotary joint for transferring fluid including a housing with a first portion having an input port aligned parallel to the longitudinal axis of the housing, and a second portion with an output port aligned parallel to the longitudinal axis. The first and second portions are rotatable with respect to one another. A channel within the housing includes an input port aligned parallel to the longitudinal axis.

In addition, this invention features an antenna assembly including a first rotating pedestal with an antenna mounted thereon, and a second pedestal supporting the first pedestal. A dual flow rotating union comprises a rotating housing portion coupled to the first rotating pedestal and a stationary housing portion coupled to the stationary pedestal. A conduit located in the housing portion has opposing ports oriented parallel to the longitudinal axis of the union. The conduit includes a rotating section and a stationary section. One conduit port is located on the rotating section and the other conduit port is located on the stationary section. The housing may also include opposing ports oriented parallel to the longitudinal axis. One housing port is located on the stationary portion and the other housing port is located on the rotating portion.

This invention further features a dual flow rotating union having a longitudinal axis including a conduit having opposing ports preferably oriented parallel to the longitudinal axis. The conduit has a first section and a second section, one conduit port located on the first section, the other conduit port located on the second section. The first section is rotatable relative to the second section. A housing is disposed about the conduit and has ports preferably oriented parallel to the longitudinal axis. The housing also includes a first portion and a second portion rotatably disposed with respect to the first portion. One housing port is located on the first portion and the other said housing port is located on the second portion.

BRIEF DESCRIPTION OF THE DRAWINGS

Other objects, features and advantages will occur to those skilled in the art from the following description of a preferred embodiment and the accompanying drawings, in which:

FIGS. 5–6 are partially broken away highly schematic views of the union shown in FIG. 4;

DISCLOSURE OF THE PREFERRED EMBODIMENT

Figure 1:
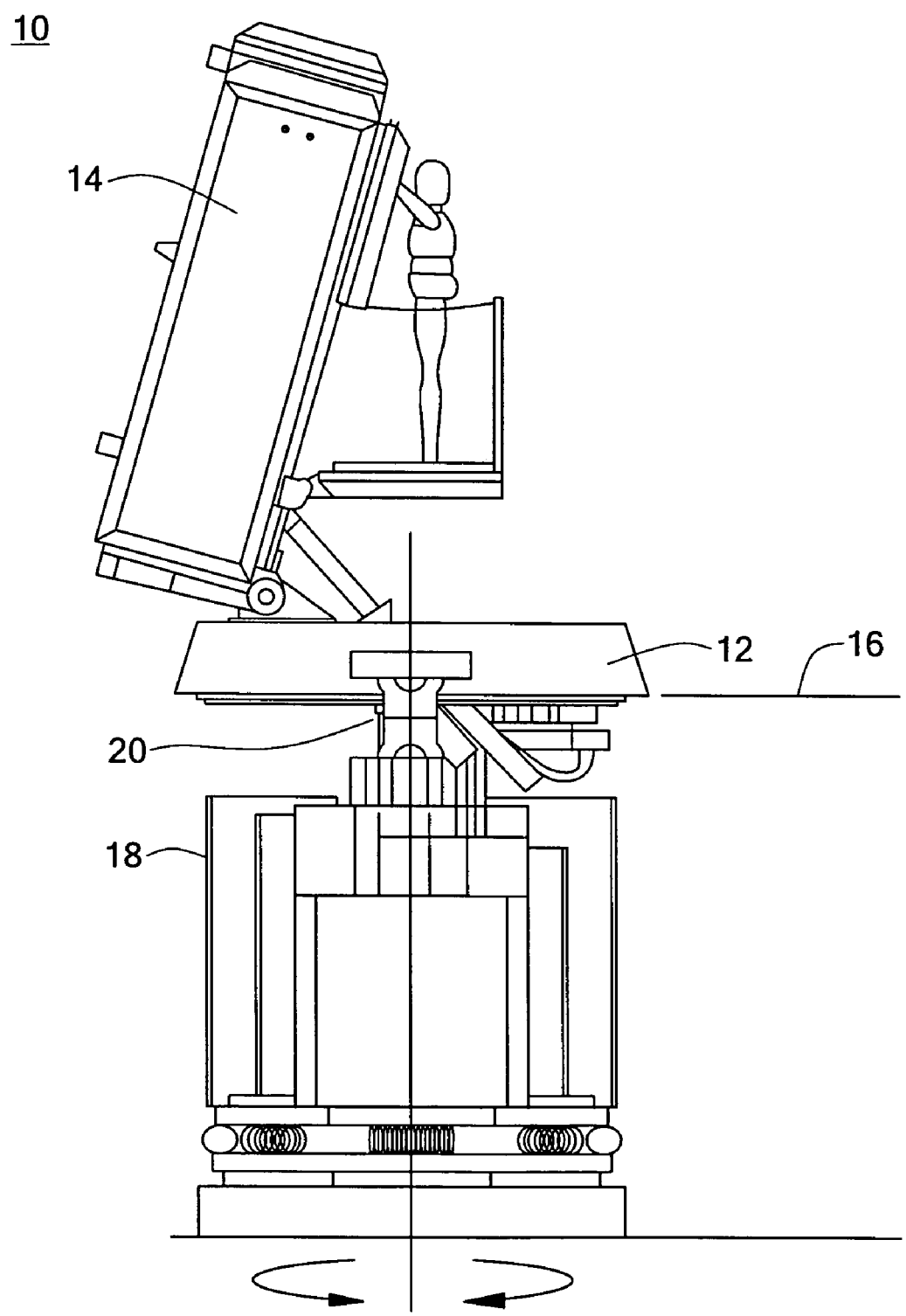
FIG. 1 is a schematic view of a rotating, oscillating, phased array antenna system.

As discussed in the background section above, phased array antenna system or antenna assembly 10, FIG. 1, includes rotating pedestal 12 including antenna 14 thereon. Typically, rotating pedestal 12 is located above the deck level of a ship as indicated by line 16. Below deck level is second pedestal 18. As also disclosed in the background section above, large volumes of fluid coolant must pass to and from rotating antenna 14 at a rate of up to 300 gallons per minute. But, because of its large size, the liquid cooling system is typically not located on any portion of rotating pedestal 12, or on second pedestal 18. Thus, coolant must be piped to and from antenna 14 through rotating union 20. In military applications, rotating union 20 must be able to survive high shock loads.

Figure 2:
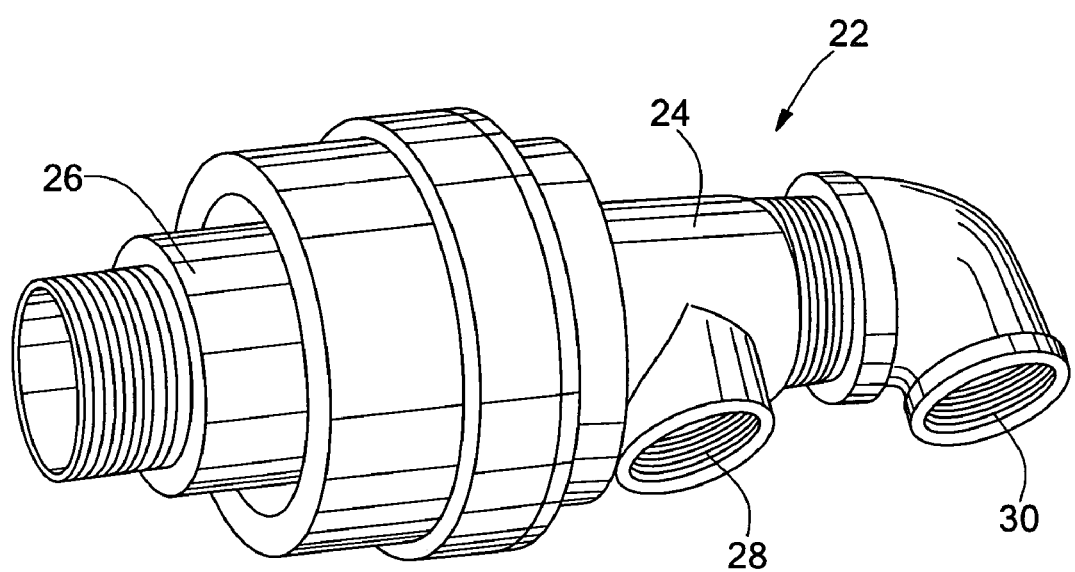
FIG. 2 is a schematic view of a prior art dual rotating union showing two right angle ports.

Prior art union 22, FIG. 2 includes stationary section 24, rotating section 26, and two right angle ports 28 and 30 on stationary section 24. These perpendicular ports cannot be used in conjunction with antenna system 10, FIG. 1, because they require an area larger than the area available in antenna system 10. Moreover, prior art rotating union 22 includes face seal 32, FIG. 3, which requires a large envelope size increasing the size of the union. Face seals also require strict tolerances, thus increasing the complexity and cost of the system as well as increasing the potential for system malfunctions or failures. Moreover, face seals do not work well in oscillating applications such as the phased array antenna system described with respect to FIG. 1. The other shortcomings associated with prior art rotating union 22, FIGS. 2–3 are described in more detail in the background section above.

Figure 3:
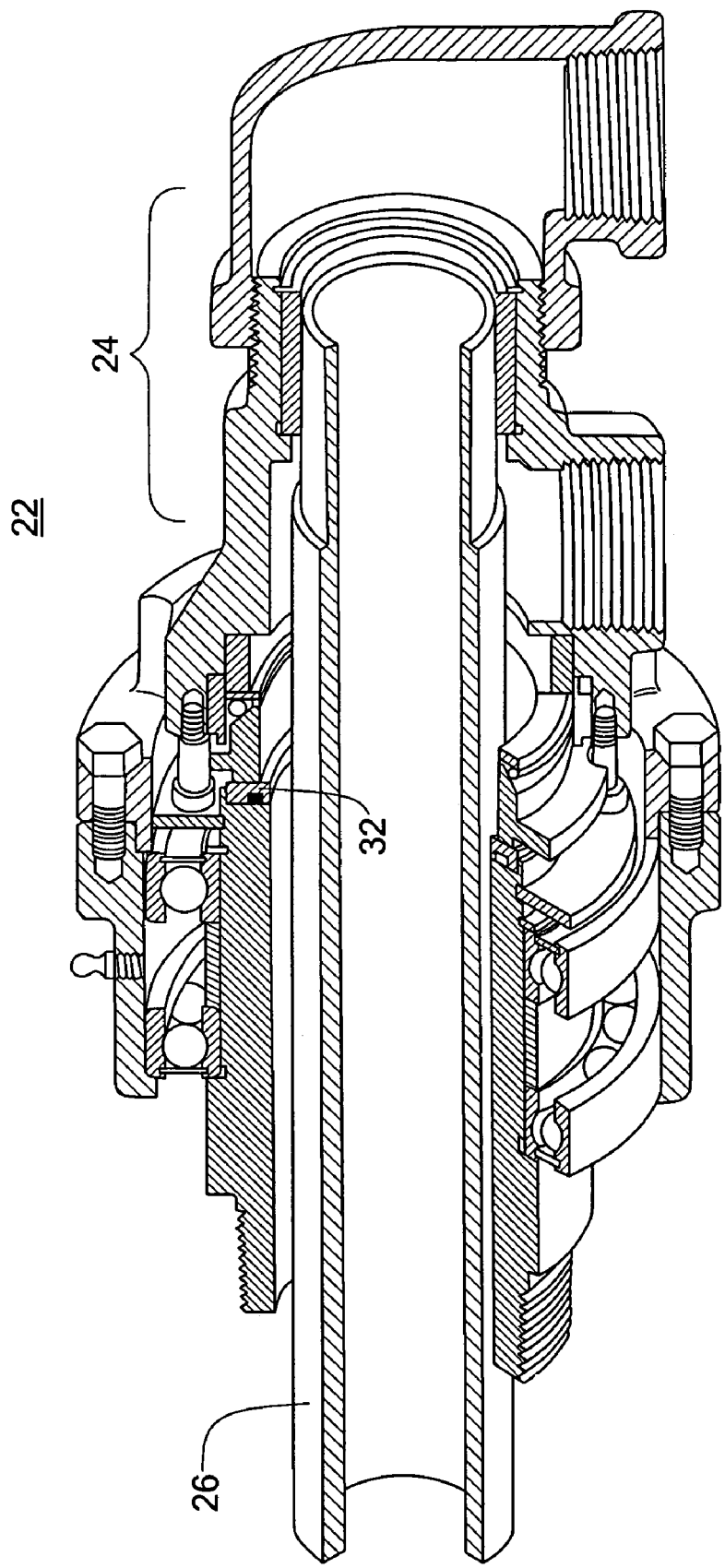
FIG. 3 is a cross-sectional schematic view of the prior art dual rotating union of FIG. 2.
Figure 4:
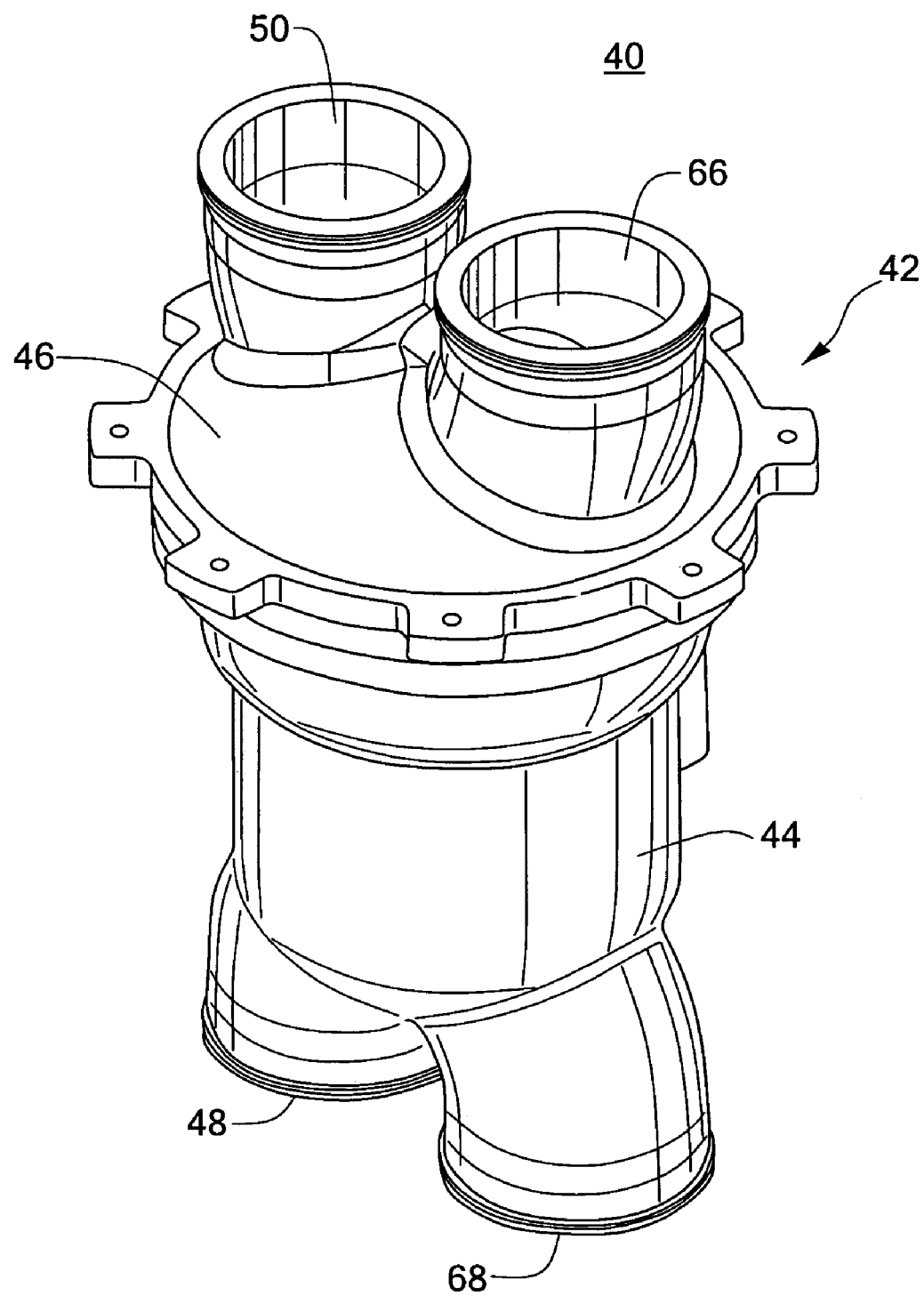
FIG. 4 is a schematic three-dimensional view of a dual flow rotating union in accordance with the present invention.

Dual flow rotating union or rotary joint 40, FIG. 4, in accordance with this invention, does not include the right angle ports of the prior art rotating union shown with respect to FIGS. 2 and 3. In one embodiment of this invention, dual flow rotating union 40 includes housing 42 with first or stator portion 44 and second or rotor portion 46. Multiple housings (not shown) may be used to create multiple channels. Housing port 48 is located on stator portion 44 and housing port 50 is located on rotor portion 46. Housing ports 48 and 50 are opposing ports and are parallel to the longitudinal axis 80 of union 40. See FIGS. 5 and 6. Rotating union 40 also includes channel or conduit 60 having first or rotating section 62 and second or stationary section 64.

Conduit port 66 is located at the proximal end 67 of rotating conduit section 62 and conduit port 68 is located at the distal end 69 of stationary conduit section 64. Conduit ports 66 and 68 are opposing ports and are parallel to the longitudinal axis 80 of union 40. As shown, conduit 60 curves such that distal end 70 of rotating section 62 rotatably mates with proximal end 72 of stationary section 64 at a location on longitudinal axis 80 of union 40. Distal end 70 of the rotating section of the conduit 62, in this example, is received in the proximal end 72 of the stationary section of the conduit 64. In FIG. 6, rotor portion 46 of housing 42 and rotating conduit section 62 have rotated 180° from the position shown in FIG. 5.

Figure 8:
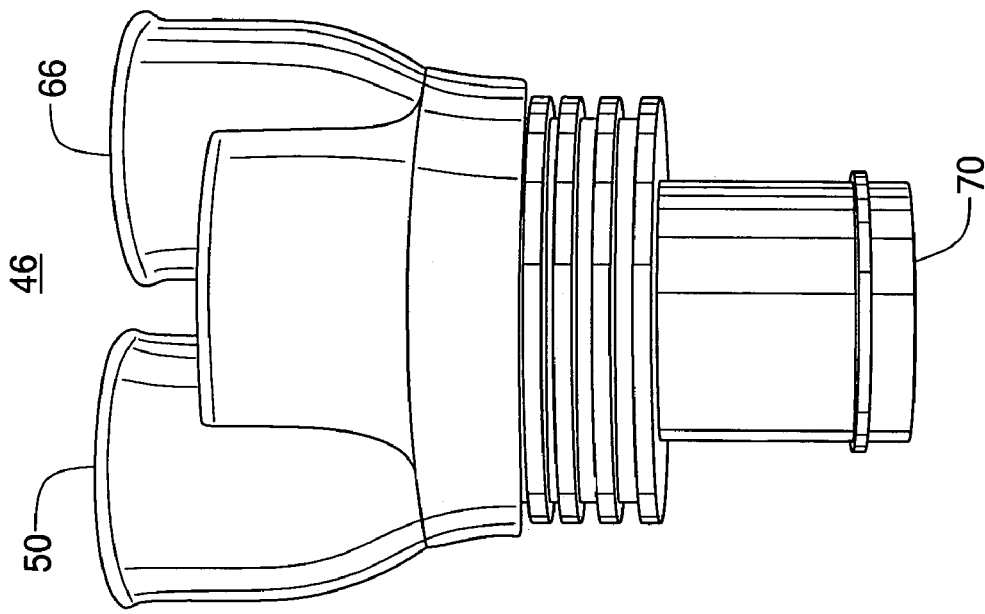
FIG. 8 is a schematic side view of the rotating section of the union of FIGS. 4–6.
Figure 7:
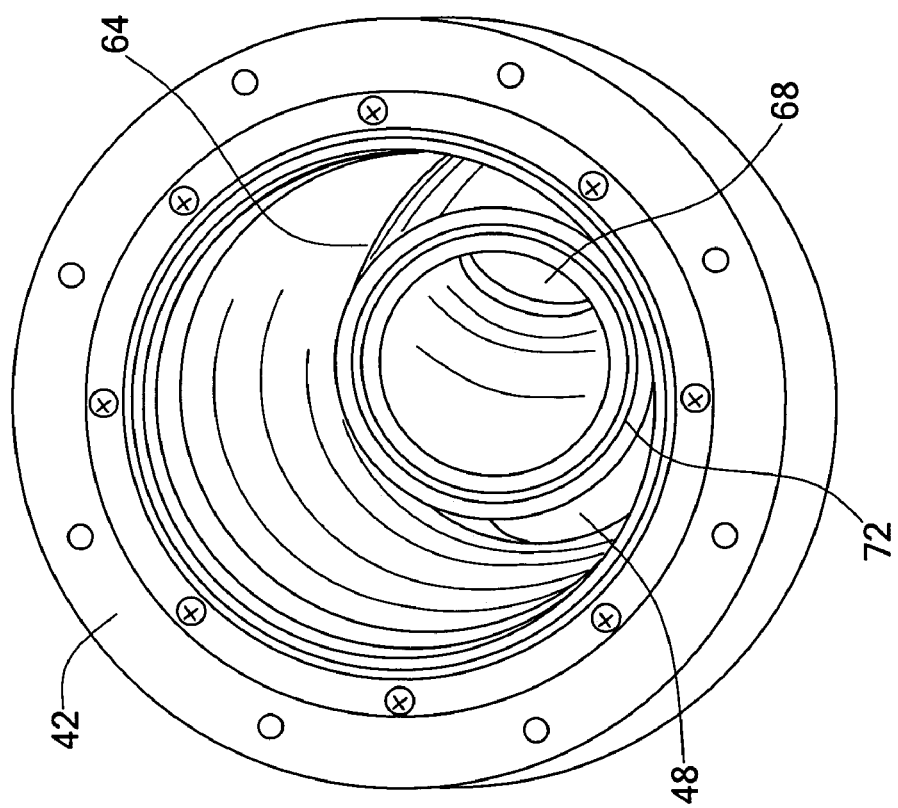
FIG. 7 is a schematic top view of the stationary section of the union of FIGS. 4–6.

A top view of the housing 42 of dual flow rotating union 40 in accordance with the present invention is shown in FIG. 7. Stationary section 64 of conduit 60, conduit port 68, the proximal end 72 of stationary section 64, and housing port 48 are also shown. In FIG. 8, the rotor portion 46 including housing port 50, conduit port 66, and the distal end 70 of conduit section 62 are shown.

Figure 10:
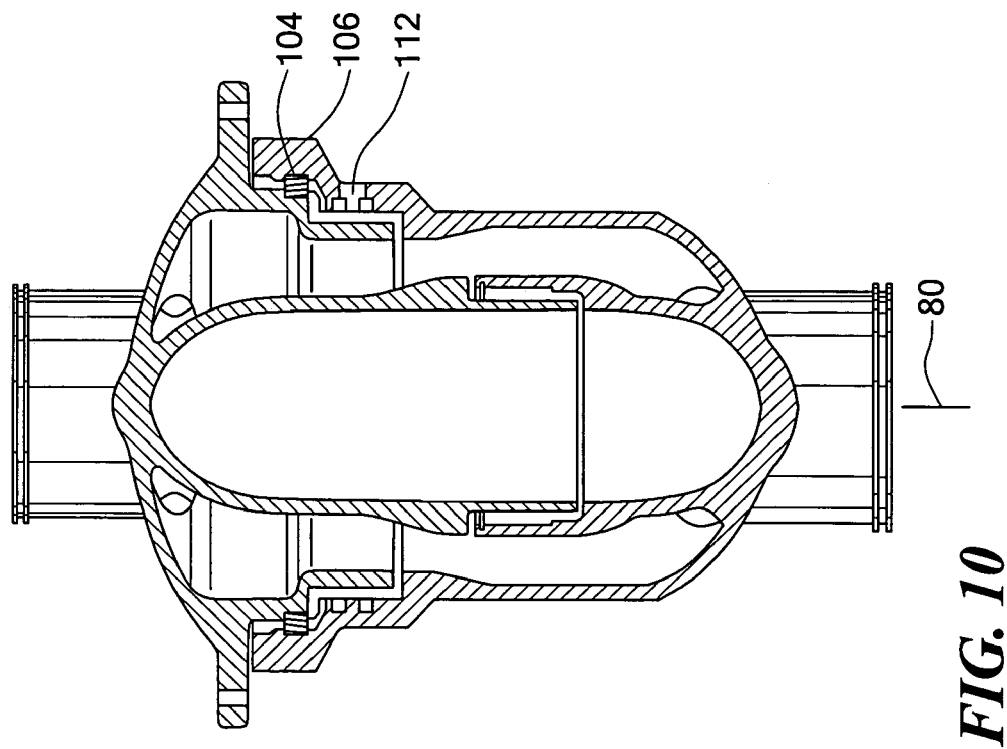
FIG. 10 is a cross-sectional side view of the union of FIGS. 4–6.
Figure 9:
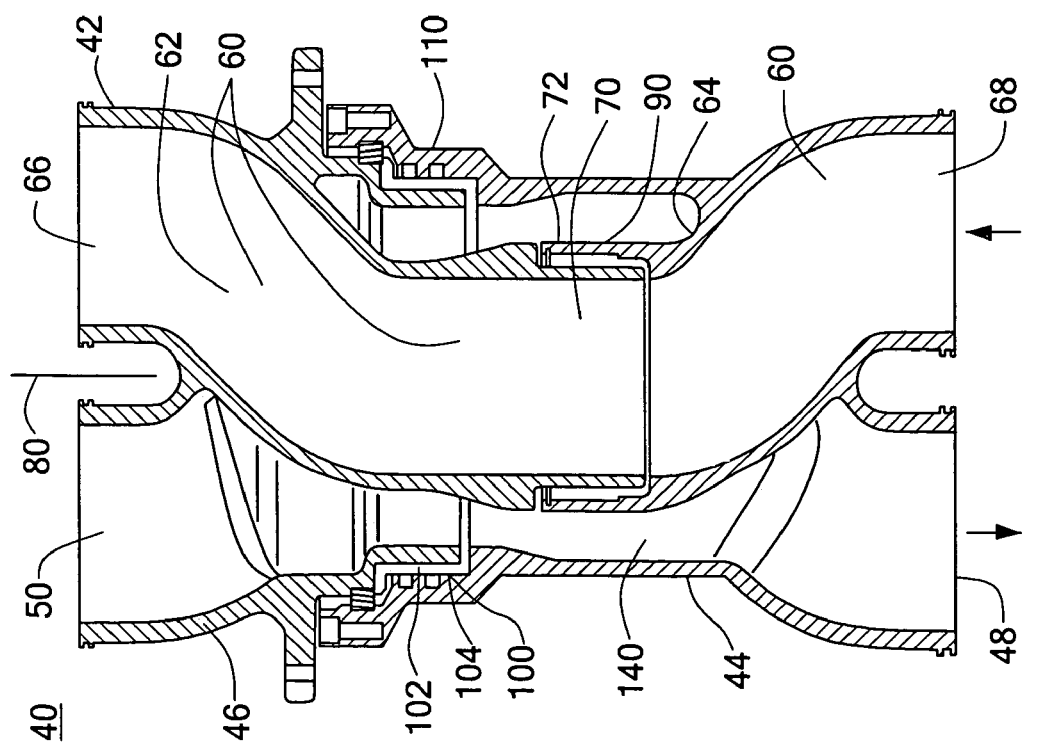
FIG. 9 is a cross-sectional front view of the union of FIGS. 4–6.

A seal and a bearing are typically located between the proximal end 72 of stationary section 64 of conduit 60 and distal end 70 of rotating section 62 of conduit 60, FIG. 9. In the preferred embodiment, combined seal and bearing 90 is employed and is disposed between proximal end 72 of stationary section 64 of conduit 60 and distal end 70 of rotating section 62 of conduit 60, and can be made of carbon and teflon but is not limited to these materials. Soft radial seals can also be used. Dual flow rotating union 40 further includes bearing assembly 100 disposed between distal outer wall 102 of rotor portion 46 of housing 42 and proximal inner wall 104 of the stator portion 44 of housing 42. Radial seal 110 is also disposed between distal outer wall 102 of the rotor portion of the housing and the proximal inner wall 104 of the stator portion of the housing. More than one radial seal 110, 110' may be utilized. In the preferred embodiment, a seepage port 112, FIG. 10, is included in fluid communication with a containment vessel or the coolant reservoir (not shown). Seepage port 112 is typically disposed through the proximal inner wall 104 of the stator portion of the housing and a proximal outer wall 106 of the stator portion of the housing, bored between radial seals 110 and 110', and together with the containment vessel prevents leakage of liquid coolant, for example, onto the deck of the ship in the event of seal wear.

In the preferred embodiment as shown in FIG. 9, rotor portion 46 of housing 42 has a distal outer wall 102 rotatably received within proximal inner wall 104 of stator portion 44 of the housing. Also as shown, rotating port 66 of the conduit 60 is disposed adjacent rotor port 50 of housing 42 and stationary section port 68 of the conduit is disposed adjacent stator port 48 of the housing. Rotor portion 46 of housing 42 has an axis of rotation the same as longitudinal axis 80, and the rotating section of conduit 62 has an axis of rotation the same as longitudinal axis 80. Also, housing 42 forms conduit 140, FIG. 9, between housing port 48 located on stator portion 44 and housing port 50 located on rotor portion 46. Rotor portion 46 of the housing and rotating portion 62 of the conduit and housing port 50 may be used in oscillating applications. Typically, flow through conduit 60 can be a direction opposite the flow through the housing 140. In one example, conduit port 68 is a supply or input port and housing port 48 is a return or output port, although the invention is not limited to fluid flow in opposite directions.

Figure 11:
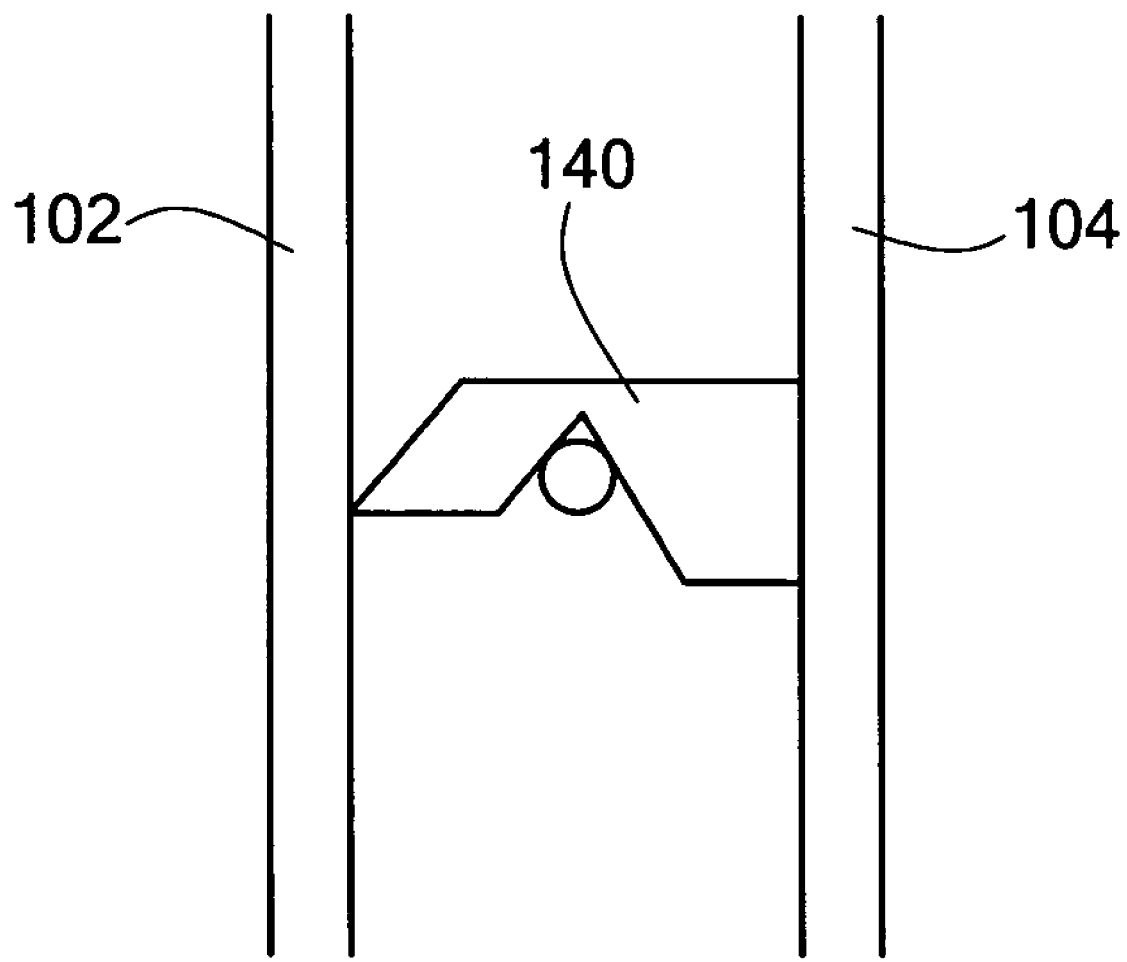
FIG. 11 is a highly schematic view of the radial seal of the dual flow rotating union of this invention.

Radial seals 110 and 110', FIG. 11, are preferably disposed between the proximal inner wall 104 of the stator portion of the housing and the distal outer wall 102 of the rotor portion of the housing and adjacent bearing assembly 100. Radial seals 110, 110' are typically attached to the proximal inner wall 104 of the stator portion of the housing.

In the preferred embodiment, all of the flow ports 50, 66, 48, 68, see FIG. 4, are located proximate the outer periphery of the union. The sum of the perimeter of the rotor ports 50 and 66 is a dimension the same order of magnitude as the perimeter of the rotor portion 46 and the sum of the perimeter of the stator ports 48 and 68 is a dimension the same order of magnitude as the perimeter of the stator portion 44, providing for increased fluid flow. In one example, all of the ports were 3.5 inches in diameter and the housing was 11.5 inches in diameter at its largest portion. Also as shown, both of the rotor ports 50, 66 are located proximate the periphery of the rotor portion 46 and both of the stator ports 48, 68 are located proximate the periphery of the stator portion 44, with the dimensions and locations of the ports so as to facilitate a large flow volume and facilitate plumbing connections.

A working model of the dual flow rotating union of the present invention was 17.375 inches high and 11.5 inches wide, weighing approximately 28 pounds. The prototype was able to accommodate a flow of 230 gallons per minute of coolant with oscillating motion of +/−220° oscillating motion at 5 rotations per minute, for three 600 hour intervals, 24 hours a day, 7 days a week, replicating conditions typically found in an antenna assembly aboard a U.S. Navy ship. The working model of the dual flow rotating union was made of metal. Those skilled in the art will understand that for specific structural designs the width, height, port size, and material are all design variables to be taken into account, and others may be used.

The dual flow rotating union of the present invention is more streamlined, lighter weight, less complex, more robust and improved. By configuring the flow ports parallel to the axis of rotation of the union, the subject invention can be used in relatively small spaces. By utilizing radial seals, the size of union is further minimized, and the invention eliminates the difficulties encountered when rotating unions are utilized in systems which oscillate and are subject to large shock loads. By having a serpentine conduit and a housing each having opposing input and output flow ports on their stationary and rotating portions, the present invention provides for a large volume of fluid or coolant to flow through the rotating union in opposite directions. Moreover, the seepage port of the present invention provides leak containment that may occur with radial seal wear.

Dual flow rotating unions in accordance with this invention are not limited to phased array antenna systems or coolant delivery, but may be used on any system requiring fluid delivery as well as for the transfer of fluid from stationary to rotating platforms, and may include multiple housings to create multi-channel systems.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. An antenna assembly comprising:
    a first rotating pedestal including an antenna thereon;
    a second pedestal supporting the first pedestal; and
    a dual flow rotating union having a longitudinal axis and comprising:
    a rotating housing portion coupled to the first rotating pedestal;
    a stationary housing portion coupled to the second stationary pedestal,
    a conduit located in the housing portion, the conduit having opposing ports oriented parallel to the longitudinal axis, the conduit having a rotating section and a stationary section, one said conduit port located on the rotating section, the other said conduit port located on the stationary section, the housing also having opposing ports oriented parallel to the longitudinal axis, one said housing port located on the stationary portion, the other said housing port located on the rotating portion.

2. The antenna assembly of claim 1 in which the conduit curves such that a distal end of the rotating section of the conduit rotatably mates with a proximal end of the stationary section of the conduit at a location on the longitudinal axis of the union.

3. The antenna assembly of claim 2 in which the distal end of the rotating section of the conduit is received in the proximal end of the stationary section of the conduit.

4. The antenna assembly of claim 3 further including a bearing between the proximal end of the stationary section of the conduit and the distal end of the rotating section of the conduit.

5. The antenna assembly of claim 3 further including a seal between the proximal end of the stationary section of the conduit and the distal end of the rotating section of the conduit.

6. The antenna assembly of claim 3 further including a combined seal and bearing disposed between the proximal end of the stationary section of the conduit and the distal end of the rotating section of the conduit.

7. The antenna assembly ion of claim 6 in which the combined seal and bearing is made of carbon and teflon.

8. The antenna assembly of claim 7 further including a bearing assembly disposed between a distal outer wall of the rotating portion of the housing and a proximal inner wall of the stationary portion of the housing.

9. The antenna assembly of claim 8 further including a radial seal disposed between the distal outer wall of the rotating portion of the housing and the proximal inner wall of the stationary portion of the housing.

10. The antenna assembly of claim 9 further including a seepage port disposed between the proximal inner wall of the stationary portion of the housing and a proximal outer wall of the stationary portion of the housing.

11. The antenna assembly of claim 1 in which the rotating portion of the housing has a distal outer wall rotatably received within a proximal inner wall of the stationary portion of the housing.

12. The antenna assembly of claim 1 in which the rotating section port of the conduit is disposed adjacent the rotating port of the housing and the stationary section port of the conduit is disposed adjacent the stationary port of the housing.

13. The antenna assembly of claim 1 wherein the rotating portion of the housing has an axis of rotation the same as the longitudinal axis.

14. The antenna assembly of claim 1 wherein the rotating section of the conduit has an axis of rotation the same as the longitudinal axis.

15. The antenna assembly of claim 1 wherein the housing forms another conduit between the housing port located on the stationary portion and the housing port located on the rotating portion.

16. The antenna assembly of claim 1 wherein the rotating portion of the housing oscillates.

17. The antenna assembly of claim 1 wherein the rotating portion of the conduit oscillates.

18. The antenna assembly of claim 7 wherein the rotating portion of the housing oscillates as one unit with the rotating section of the conduit.

19. The antenna assembly of claim 1 wherein flow through the conduit is in a direction opposite flow through the housing.

20. An antenna assembly comprising:
a first rotating pedestal including an antenna thereon;
a second pedestal supporting the first pedestal; and
a dual flow rotating union having a longitudinal axis and comprising:
a rotating housing portion coupled to the first rotating pedestal;
a stationary housing portion coupled to the second stationary pedestal,
a conduit located in the housing portion, the conduit having offset opposing ports oriented parallel to the longitudinal axis, the conduit having a rotating section and a stationary section, one said conduit port located on the rotating section, the other said conduit port located on the stationary section, the housing also having opposing ports oriented parallel to the longitudinal axis, one said housing port located on the stationary portion, the other said housing port located on the rotating portion.

* * * * *